(12) United States Patent  
Kaneda et al.

(10) Patent No.: US 8,102,458 B2  
(45) Date of Patent: Jan. 24, 2012

(54) TILT DIRECTION DETECTOR FOR ORIENTING DISPLAY INFORMATION

(75) Inventors: Hideo Kaneda, Tokyo (JP); Takehito Ishiwata, Kawaguchi (JP)

(73) Assignee: Sony Corporation, Tokyo (JP)

( * ) Notice: Subject to any disclaimer, the term of this patent is extended or adjusted under 35 U.S.C. 154(b) by 298 days.

(21) Appl. No.: 11/905,956

(22) Filed: Oct. 5, 2007

(65) Prior Publication Data

US 2008/0036876 A1  Feb. 14, 2008

Related U.S. Application Data

(62) Division of application No. 10/169,248, filed as application No. PCT/JP99/07392 on Dec. 28, 1999, now abandoned.

(51) Int. Cl.
*H04N 5/222* (2006.01)
*H04N 5/225* (2006.01)

(52) U.S. Cl. ................. 348/333.01; 348/373

(58) Field of Classification Search .......... None
See application file for complete search history.

(56) References Cited

U.S. PATENT DOCUMENTS

| | | | |
|---|---|---|---|
| 5,825,675 A | 10/1998 | Want et al. | |
| 5,949,408 A * | 9/1999 | Kang et al. | 345/169 |
| 6,262,769 B1 | 7/2001 | Anderson et al. | |
| 6,473,123 B1 | 10/2002 | Anderson | |
| 6,538,636 B1 | 3/2003 | Harrison | |
| 6,621,481 B1 | 9/2003 | Kanbara | |
| 6,630,958 B2 | 10/2003 | Tanaka et al. | |
| 6,903,773 B1 | 6/2005 | Fushimoto | |
| 7,030,912 B1 | 4/2006 | Honma | |

FOREIGN PATENT DOCUMENTS

| | | |
|---|---|---|
| JP | 64-007123 | 1/1989 |
| JP | 6-324805 | 11/1994 |
| JP | 7-104889 | 4/1995 |
| JP | 07-281806 | 10/1995 |
| JP | 8-221365 | 8/1996 |
| JP | 09-171212 | 6/1997 |
| JP | 09-257658 | 10/1997 |
| JP | 9-294221 | 11/1997 |
| JP | 9-305315 | 11/1997 |
| JP | 10-149258 | 6/1998 |
| JP | 10-161620 | 6/1998 |
| JP | 10-187342 | 7/1998 |
| JP | 11-136653 | 5/1999 |
| JP | 11-341319 | 12/1999 |
| JP | 2000-322386 | 11/2000 |
| JP | 2001-169156 | 6/2001 |

* cited by examiner

*Primary Examiner* — Justin P Misleh
(74) *Attorney, Agent, or Firm* — Oblon, Spivak, McClelland, Maier & Neustadt, L.L.P.

(57) ABSTRACT

An electronic apparatus having a display function is able to alter the orientation of an image displayed on a display means for displaying images between a first orientation and a second orientation different from the first orientation. A plurality of operating means are provided at positions symmetrical between disposal positions which take the first orientation as a standard orientation and disposal positions which take the second orientation as a standard orientation.

17 Claims, 19 Drawing Sheets

(1) CALCULATOR
(2) HANDWRITTEN MEMO
(3) ADDRESS LIST
(4) SCHEDULE
(5) MAIN
(6) SMART (7) SMART
(8) MAIN
(9) SCHEDULE
(10) ADDRESS LIST
(11) HANDWRITTEN MEMO
(12) CALCULATOR

(13) Purchase a Birthday gift for my girlfriend.
(14) AIWA SHOW
(15) Midnight meeting.
(16) Parts show.
(17) Meeting A.
(18) Section meeting.
(19) 1998   (20) April
(21) 24    (22) month
(23) week   (24) day
(25) SCHEDULE
(26) DATA   (27) EDIT
(28) SET    (29) HELP
(30) CALCULATOR  (31) HANDWRITTEN MEMO
(32) ADDRESS LIST  (33) SCHEDULE  (34) MAIN  (35) SMART

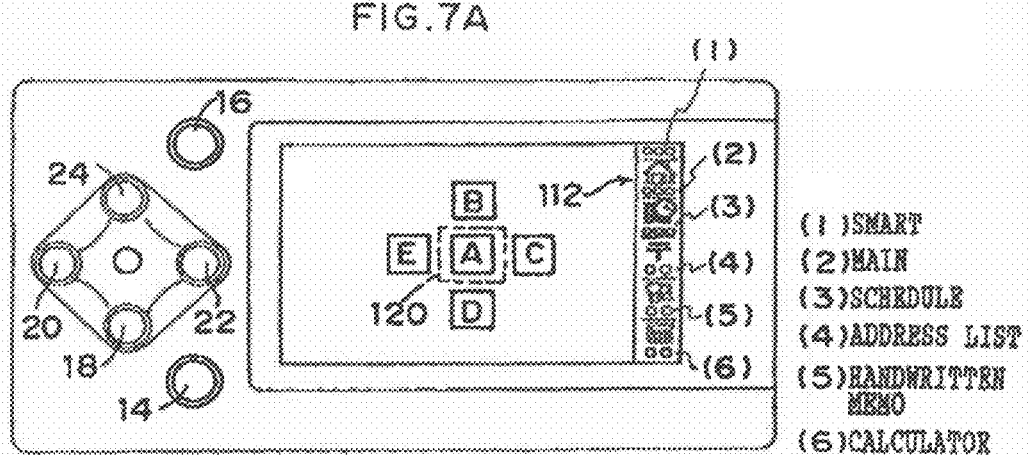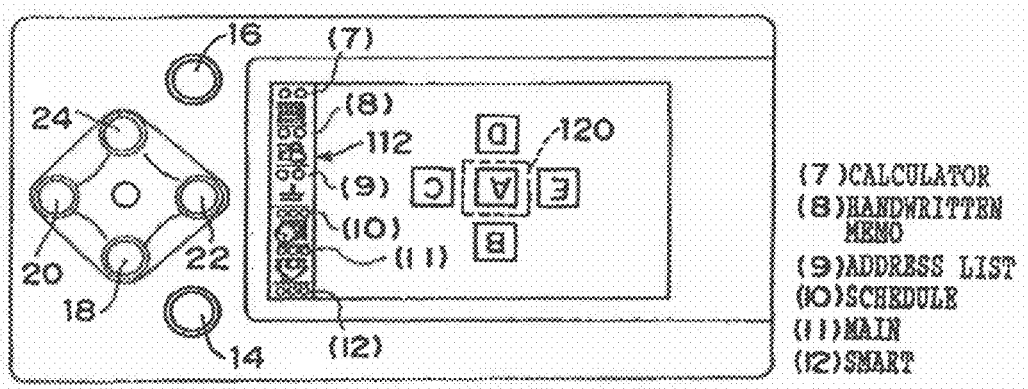

(1) ENVIRONMENT SETTING
(2) DATA
(3) EDIT
(4) SET
(5) HELP
(6) SMART
(7) MAIN
(8) SCHEDULE
(9) ADDRESS LIST
(10) HANDWRITTEN MEMO
(11) CALCULATOR (1) SCHEDULE
(2) DATA
(3) EDIT
(4) SET
(5) HELP
(6) SMART
(7) MAIN
(8) SCHEDULE
(9) ADDRESS LIST
(10) HANDWRITTEN MEMO
(11) CALCULATOR
(12) 1998

(13) April  (14) 24  (15) month  (16) week  (17) day  (18) Section meeting
(19) Meeting A.  (20) Parts show.  (21) Midnight meeting.  (22) AIWA SHOW
(23) Purchase a Birthday gift for my girlfriend.

(24) SCHEDULE
(25) DATA
(26) 1998
(27) April
(28) 24
(29) SMART
(30) MAIN
(31) SCHEDULE
(32) ADDRESS LIST
(33) HANDWRITTEN MEMO
(34) CALCULATOR

FIG. 19A (1) SCHEDULE (2) DATA (3) EDIT (4) SET (5) HELP
(6) 1998 (7) April (8) 24
(9) month (10) week (11) day
(12) Section meeting
(13) Meeting A.
(14) Parts show.
(15) Midnight meeting
(16) AIWA SHOW
(17) Purchase a Birthday gift for my girlfriend.
(18) SMART  (19) MAIN
(20) SCHEDULE
(21) ADDRESS LIST
(22) HANDWRITTEN MEMO
(23) CALCULATOR

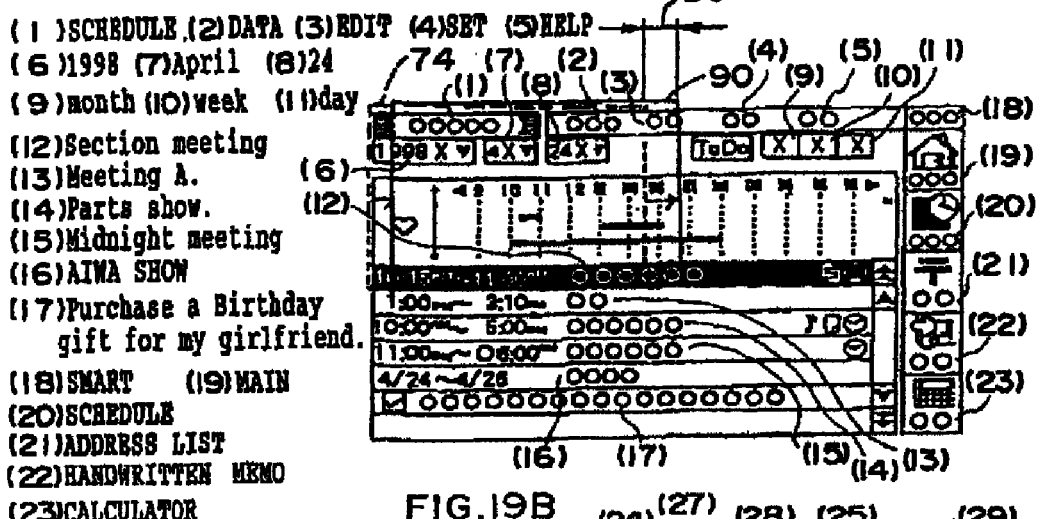

FIG. 19B

(24) SCHEDULE (25) DATA
(26) 1998 (27) April (28) 24
(29) SMART  (30) MAIN
(31) SCHEDULE
(32) ADDRESS LIST
(33) HANDWRITTEN MEMO
(34) CALCULATOR

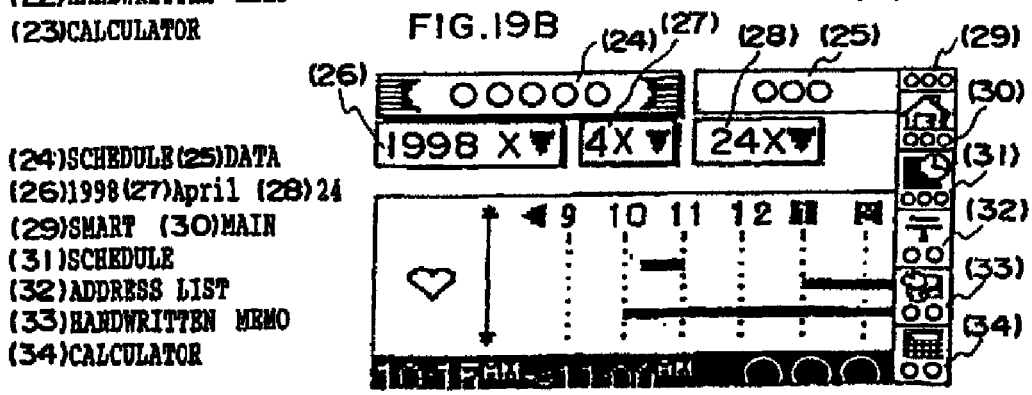

FIG. 19C

(35) SCHEDULE  (36) DATA
(37) EDIT   (38) April
(39) 24
(40) SMART   (41) MAIN
(42) SCHEDULE
(43) ADDRESS LIST
(44) HANDWRITTEN MEMO
(45) CALCULATOR

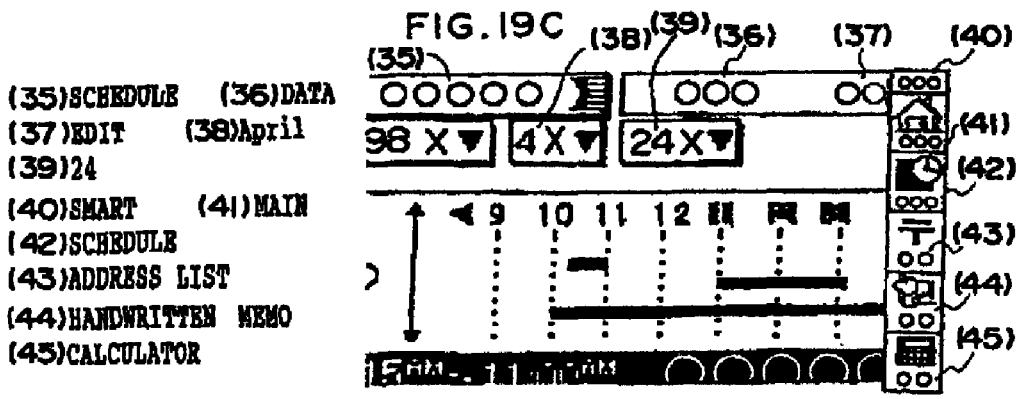

TILT DIRECTION DETECTOR FOR ORIENTING DISPLAY INFORMATION

This is a Divisional Application of abandoned U.S. patent application Ser. No. 10/169,248, filed Oct. 3, 2002, which was a national stage of PCT/JP99/07392, filed Dec. 28, 1999.

BACKGROUND OF THE INVENTION

1. Field of the Invention

The present invention relates to an electronic apparatus having a display function, and particularly to an electronic apparatus having a display function capable of altering the orientation of images displayed on a display means.

2. Description of the Related Art

Conventional electronic apparatuses having a display function are able to display and edit input data on a display surface.

A plurality of buttons for instructing the movement of a cursor are provided on the outer left hand side of the display surface in this electronic apparatus having a display function, and data is input using a data input pen.

However, in the above electronic apparatus having a display function, the aforementioned buttons are provided on the outer left hand side of the display screen so that a right handed person may use the apparatus. Specifically, a right handed person can hold the pen in their right hand and instruct the movement of the cursor by operating the buttons with their left hand. Furthermore, in the above type of electronic apparatus having a display function, when the buttons are provided at the outer left hand side of the display surface and the pen is being held in the right hand of the user, images are displayed with an orientation which makes them easily seen by a right handed person.

Consequently, if the electronic apparatus having a display function is inverted in order to make it easier for a left handed person to operate the buttons with their right hand and input data using the pen in their left hand, images are also displayed upside down making them difficult to discern. Moreover, if the electronic apparatus having a display function is inverted, the positions of the plurality of buttons relative to each other are switched after the inversion from the positions before the inversion. Accordingly, the operability of the plurality of buttons is changed.

SUMMARY OF THE INVENTION

The present invention was developed in view of the above, and it is an objective thereof to provide an electronic apparatus having a display function in which the operability of a plurality of operating means can be improved.

In order to achieve the above aim, the first aspect of the present invention is an electronic apparatus having a display function comprising: display means for displaying an image; a plurality of operating means; and control means for controlling the display means so that an orientation of an image displayed on the display means is altered between a first orientation and a second orientation which is different from the first orientation, wherein the operating means is disposed at a position which is symmetrical between a disposal position which takes the first orientation as a standard orientation and a disposal position which takes the second orientation as a standard orientation.

Namely, the electronic apparatus having a display function according to the first aspect is able to switch the orientation of an image displayed on the display means between a first orientation and a second orientation which is different from the first orientation. This allows the orientation of an image to be matched with the orientation of the electronic apparatus having a display function when the orientation of the electronic apparatus having a display function is altered, thus preventing images from becoming difficult to discern.

The plurality of operating means of the electronic apparatus having a display function is disposed at a position symmetrical to a disposal position which takes the first orientation as the standard orientation and a disposal position which takes the second orientation as the standard orientation. Consequently, even if the orientation of the electronic apparatus having a display means is altered thereby altering the orientation of an image to the first orientation or the second orientation, the operability of the plurality of operating means can be kept the same. Thus the operability of the plurality of operating means is improved.

Note that the operating means may be a cursor movement instructing means for instructing the movement of a cursor displayed on a display means. In this case, the control means controls the display means so that the cursor moves in accordance with a cursor movement instruction from the cursor movement instructing means.

Furthermore, the operating means may also be an orientation alteration instructing means for giving an instruction for the orientation of the image to be switched between a first orientation and a second orientation. In this case, the control means controls the display means so that the orientation of an image is switched between a first orientation and a second orientation in accordance with an image orientation alteration instruction from the orientation alteration instructing means.

The second aspect of the present invention is an electronic apparatus having a display function comprising: display means for displaying an image; orientation alteration instructing means for giving an instruction for an orientation of an image displayed on the display means to be altered between a first orientation and a second orientation which is different from the first orientation; and control means for controlling the display means so that the orientation of the image is altered between the first orientation and the second orientation in accordance with an image orientation alteration instruction from the orientation alteration instructing means, wherein the electronic apparatus having a display function further comprises a plurality of cursor movement instructing means for instructing a movement of a cursor displayed on the display means, and wherein when a movement of the cursor is instructed by the cursor movement instructing means, the control means controls the display means so that the orientation of an image displayed at the time the instruction is given is set as standard, and the cursor moves in directions which correspond to a position at which the cursor movement instructing means is disposed.

In the same way as in the first aspect, in the electronic apparatus having a display function according to the second aspect of the present invention, the orientation of the image displayed on the display means is able to be switched between a first orientation and a second orientation which is different from the first orientation. Moreover, the electronic apparatus having a display function is further provided with a plurality of cursor movement instructing means for instructing the movement of the cursor displayed on the display means. In addition, when a movement of the cursor is instructed by the cursor movement instructing means, the control means controls the display means so that the orientation of the image displayed at the time the instruction is given is set as standard, and the cursor moves in directions which correspond to the position at which the cursor movement instructing means is disposed. Because the orientation of the image displayed at the time the instruction was given by the cursor movement instructing means has been set as the standard orientation and the cursor moves in directions which accord with this orientation, the cursor movement instructing means may be operated in accordance with the orientation of the image. Moreover, even if the orientation of the image is altered, the operability of the cursor movement instructing means can be kept the same and the operability of the plurality of cursor movement instructing means can be improved.

The third aspect of the present invention is an electronic apparatus having a display function comprising: display means for displaying an image; orientation alteration instructing means for giving an instruction that an orientation of an image displayed on the display means be altered between a first orientation and a second orientation which is different from the first orientation; and control means for controlling the display means so that the orientation of the image is altered between the first orientation and the second orientation in accordance with an image orientation alteration instruction from the orientation alteration instructing means, wherein the electronic display apparatus having a display function further comprises a plurality of cursor movement instructing means including a first cursor movement instructing means and a second cursor movement instructing means for instructing a movement of a cursor displayed on the display means, and wherein when a movement of the cursor is instructed by the first cursor movement instructing means, the control means controls the display means so that the cursor is moved in a first direction when the image has the first orientation and in a second direction different from the first direction when the image has the second orientation, and when a movement of the cursor is instructed by the second cursor movement instructing means, the control means controls the display means so that the cursor is moved in the second direction when the image has the first orientation and in the first direction when the image has the second orientation.

In the same way as in the first and second aspects of the present invention, in the electronic apparatus having a display function according to the third aspect of the present invention, the orientation of the image displayed on the display means can be switched between a first orientation and a second orientation which is different from the first orientation. Furthermore, the electronic apparatus having a display function is further provided with a plurality of cursor movement instructing means including a first cursor movement instructing means and a second cursor movement instructing means for instructing the movement of a cursor displayed on the display means. In addition, when an instruction to move the cursor is given by the first cursor movement instructing means, the control means controls the display means so that the cursor is moved in a first direction when the image has the first orientation and in a second direction which is different from the first direction when the image has the second orientation, and when a movement of the cursor is instructed by the second cursor movement instructing means, the control means controls the display means so that the cursor is moved in the second direction when the image has the first orientation and in the first direction when the image has the second orientation. In this way, because the direction in which the cursor moves when instructed by the first cursor movement instructing means and the direction in which the cursor moves when instructed by the second cursor movement instructing means are the reverse of each other both when the image has the first orientation and when the image has the second orientation, the first cursor movement instructing means and the second cursor movement instructing means may be selectively operated in accordance with the orientation of the image. Consequently, even if the orientation of the image is altered, the operability of the cursor movement instructing means can be kept the same and the operability of the plurality of cursor movement instructing means by a left handed person can be improved. Note that, in this case, the first direction and the second direction may be set so as to be the reverse of each other.

Note also that in the above first through third embodiments, the first orientation and the second orientation may be set so as to be opposite to each other.

The fourth aspect of the present invention is an electronic apparatus having a display function comprising: display means for displaying an image; orientation alteration instructing means for giving an instruction that an orientation of an image displayed on the display means be altered; a plurality of cursor movement instructing means for instructing a movement of a cursor displayed on the display means; and control means for controlling the display means in such a way that the orientation of the image is altered when an instruction to alter the orientation of the image is given by the orientation alteration instructing means and for controlling the display means in such a way that the cursor is moved when an instruction to move the cursor is given by the cursor movement instructing means, wherein the control means controls a movement direction in which the cursor is moved when an instruction to move the cursor is given by the cursor movement instructing means so that the movement direction is a direction determined in advance to correspond to the relative positions at which each of the plurality of movement instructing means are disposed, regardless of the orientation of the image which has been altered in accordance with the instruction from the orientation alteration instructing means.

Namely, in the electronic apparatus having a display function according the fourth aspect of the present invention, the orientation of an image is altered in accordance with an instruction to alter the orientation of the image, and the cursor is moved in accordance with an instruction to move the cursor. In addition, the control means controls the movement directions in which the cursor is moved when instructions to move the cursor are given by the cursor movement instructing means so that the movement directions are directions determined in advance to correspond to the positions relative to each other at which each of the plurality of movement instructing means are disposed, regardless of the orientation of the image which has been altered in accordance with an instruction from the orientation alteration instructing means. In this way, because the directions in which the cursor is moved are set so as to be directions determined in advance to correspond to the relative positions at which each of the plurality of movement instructing means are disposed regardless of the orientation of the image, even if the orientation of the image is altered, the operability of the cursor movement instructing means can be kept the same and the operability of the plurality of cursor movement instructing means can be improved.

The first through fourth aspects of the present invention may also be structured according to the following descriptions.

Namely, the orientation alteration instructing means comprises a tilt direction detecting sensor for detecting a direction of a tilt of a body of an electronic apparatus having a display function, and the control means controls the display means so that an orientation of the image matches a direction set in advance relative to the tilt direction detected by the tilt direction detecting sensor.

Moreover, the electronic apparatus having a display function is structured so that photographing means for photographing an object can be mounted in a plurality of directions relative to the body of the electronic apparatus having a display function, and the control means controls the display means so that an image obtained by photography using the photographing means is displayed and an orientation of the image matches a direction determined in advance relative to a direction in which the photographing means is mounted. Note that, in this case, the electronic apparatus having a display function may be structured so that the photographing means may be mounted at a single location or at least at any one location in each of a plurality of directions relative to the body of the electronic apparatus having a display function.

Moreover, the control means controls the display means so that, when a process execution instruction image for giving an instruction to execute a predetermined process is displayed at the same time as an instruction is given by the orientation alteration instructing means to alter the orientation of an image, the orientation of the image including the process execution instruction image is altered by the display means.

Moreover, the electronic apparatus having a display function is a portable electronic apparatus.

Furthermore, the orientation alteration instructing means is a menu item displayed on the display means.

BRIEF DESCRIPTION OF THE DRAWINGS

FIGS. 7A and 7B show results of a cursor movement process.

FIGS. 19A to 19C are views explaining the fine adjustment of the movement of a split image.

DESCRIPTION OF THE PREFERRED EMBODIMENTS

Figure 1:
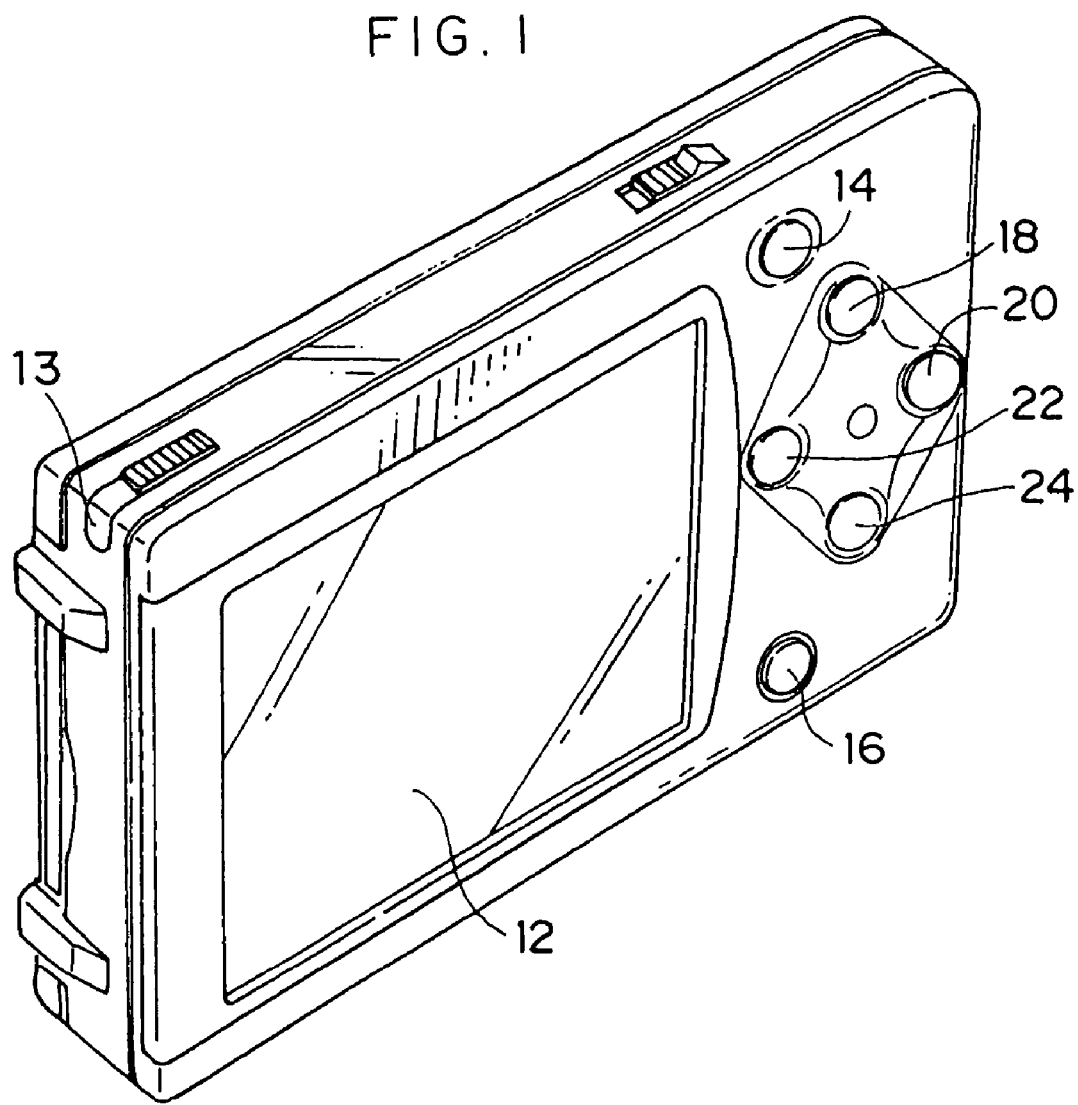
FIG. 1 is a perspective view of a portable display apparatus according to the first embodiment of the present invention.
Figure 2:
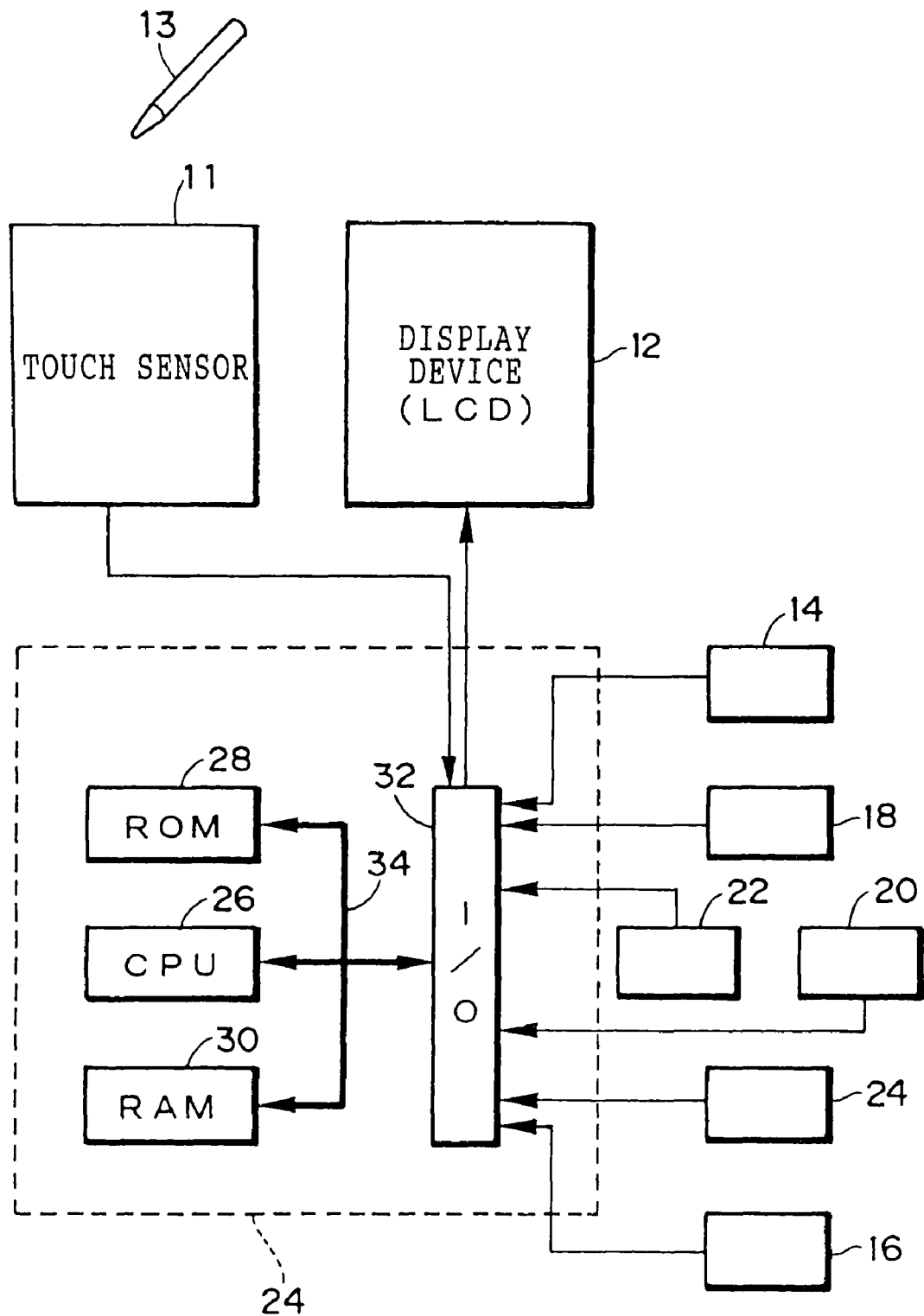
FIG. 2 is a block diagram showing a control system of the portable display apparatus according to the present embodiment.

The embodiments of the present invention will now be explained in detail with reference to the drawings. A portable display apparatus (PDA) according to an electronic apparatus having a display function of the present embodiment is shown in FIG. 1. As is shown in FIG. 1, the portable display apparatus is provided with a display device 12 comprising a liquid crystal display or the like for displaying images. The portable display apparatus is further provided with a first screen inversion instruction button 14 for giving an instruction for the screen of the display device 12 to be inverted (described below) and a second screen inversion instruction button 16. The portable display apparatus is further provided with movement instruction buttons 18, 20, 22, and 24 for giving instructions for the cursor displayed on the display device 12 to be moved (described below). Note that the first screen inversion instruction button 14, the second screen inversion instruction button 16, and the movement instruction buttons 18, 20, 22, and 24 are all disposed at symmetrical positions relative to each of the orientations to which an image can be altered. Note also that one side of the body of the portable display apparatus houses a touch pen 13 for inputting data by touching the screen of the display device 12. Note further that a touch sensor 11, as shown in FIG. 2, for detecting the position on the screen of the display device 12 touched by the touch pen 13 is provided at the screen of the display device 12.

Next, the control system of the portable display apparatus according to the present embodiment will be described. As is shown in FIG. 2, this control system is provided with a microcomputer 24. The microcomputer 24 is provided with a CPU 26, ROM 28, RAM 30, and an input/output (I/O) port 32. These are all structured so as to be connectable to each other via a bus 34. The display device 12 (described below), the first screen inversion instruction button 14, the second screen inversion instruction button 16, the movement instruction buttons 18 to 24, and the touch sensor 11 are connected to the input/output port 32.

Figure 3:
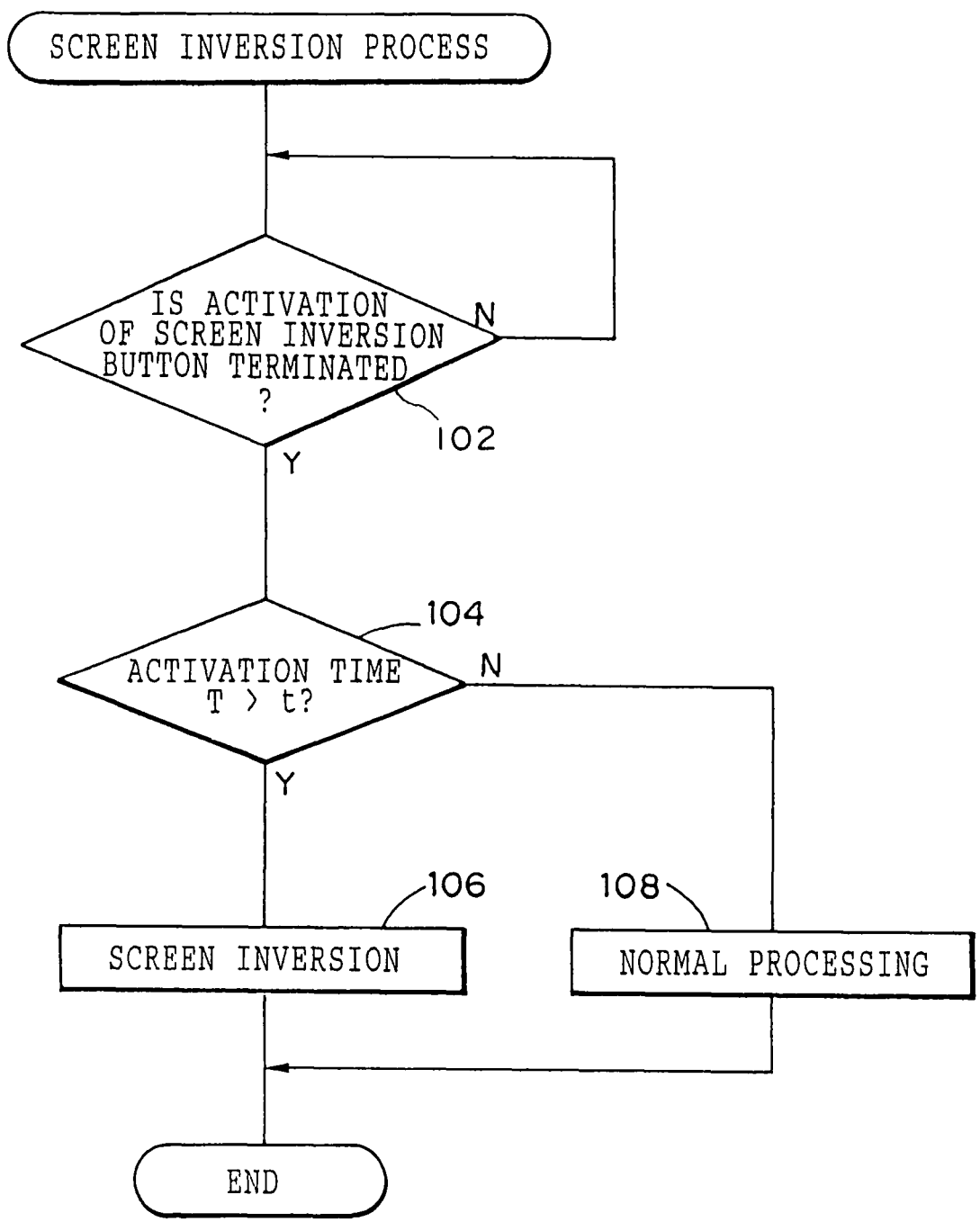
FIG. 3 is a flow as chart showing a screen inversion process routine.

The screen inversion process routine which starts when either the first screen inversion instruction button 14 or the second inversion instruction button 16 is activated is shown in FIG. 3. In step 102 of FIG. 3, a determination is made as to whether or not the activation of the first screen inversion instruction button 14 or the second screen inversion instruction button 16 which allows the screen inversion process routine to start has been terminated. If the activation has been terminated, then, in step 104, a determination is made as to whether or not the activation time T, which is the time the screen inversion instruction button has been operated in an activated state (the time from when the present routine started until the time the determination in step 102 is affirmative), is longer than a predetermined time t (e.g. 1 second).

Figure 4A:
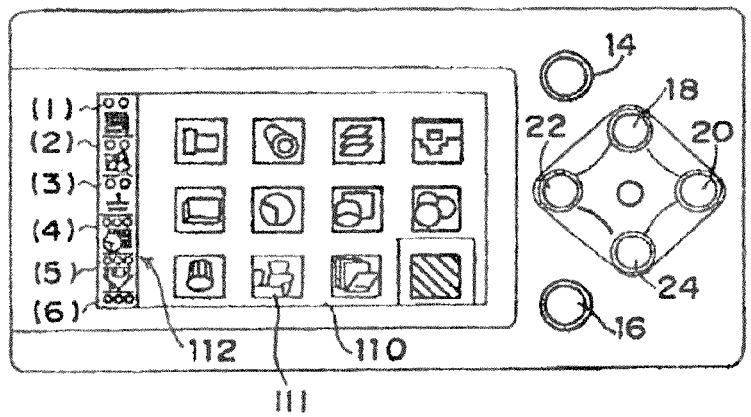
FIGS. 4A to 4C show results of a screen determining process.

Note that in the present embodiment, as is shown in FIG. 4A, a plurality of icons 111 and menus 112, for example, are displayed on the screen 110 of the display device 12 and the cursor is displayed on one of the menu bars from one of the icons 111 and menus 112. A selection can then be made as to whether to instruct the screen to be inverted or whether to instruct normal processing in accordance witch the length of time the screen inversion instruction button 14 or 16 is activated.

Figure 4B:
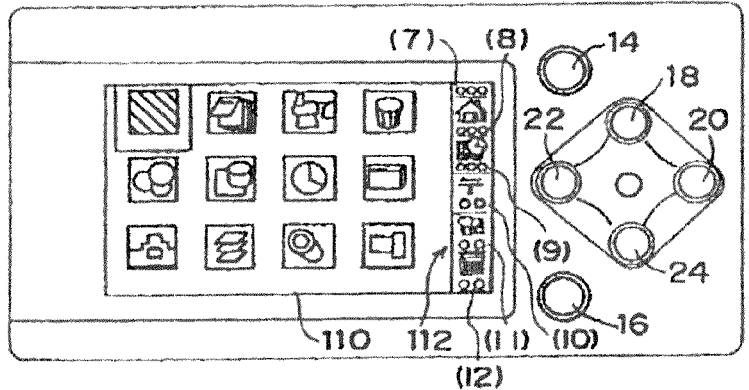
Figure 4C:
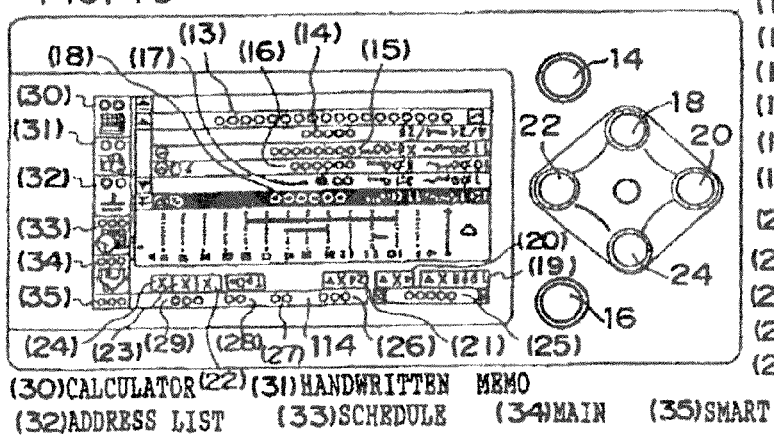

Namely, if the activation time T is determined in step 104 to be greater than the time t, then, in step 106, the screen is inverted. Namely, the screen 110 shown in FIG. 4A is inverted, as is shown in FIG. 4B. The menu 112 is also inverted at this time. If, however, the activation time T is not determined in step 104 to be greater than the time t, then, in step 108, normal processing is performed. Namely, as is shown in FIG. 4A, if the cursor is displayed on an icon representing schedule application software, then, as is shown in FIG. 4C, the schedule application software, which includes a menu 114, is run. Note that the orientation of the screen shown in FIG. 4C is the same as the orientation of the screen shown in FIG. 4A, while the orientation of the screen shown in FIG. 4B is the reverse of the orientation of the screen shown in FIG. 4A.

Figure 5A:
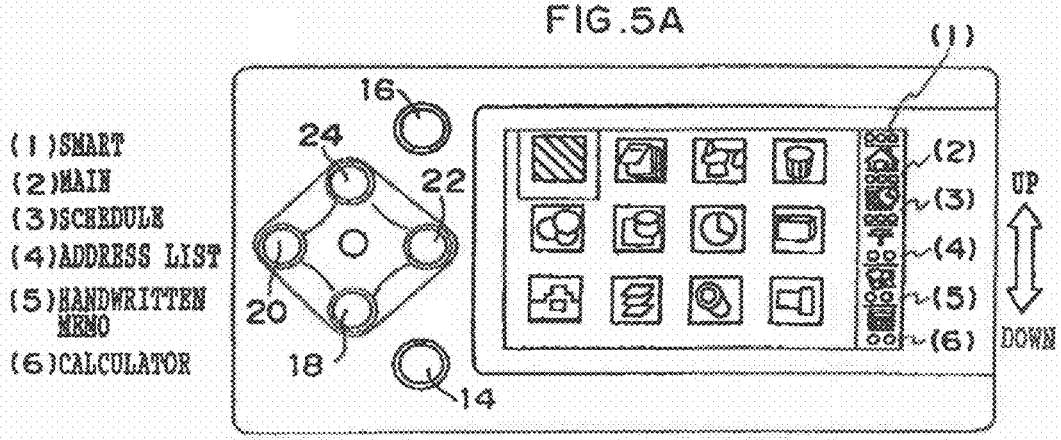
FIGS. 5A and 5B show states where the apparatus body and screen have been inverted.
Figure 5B:
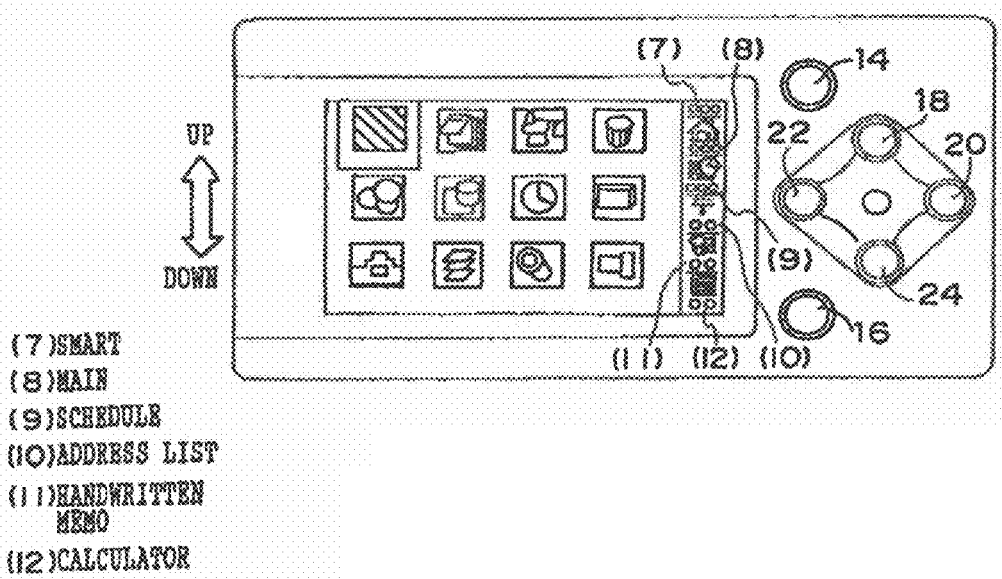

If the orientation of the screen can be altered in this way, then the following effect can be obtained. Namely, a right handed person holds the touch pen in their right hand and inputs data using the pen while operating the buttons with their left hand in order to move the cursor (data input mode). Therefore, the orientation of the screen when looking at the screen is desirably such that the various buttons are positioned at the left hand side, as seen in FIG. 5A (refer to the arrows indicating up and down in FIG. 5A). However, if the orientation of the screen when looking at the screen is such that the various buttons are positioned at the right hand side, as seen in FIG. 5B (refer to the arrows indicating up and down in FIG. 5B), then operations in which data has to be input with the right hand using the touch pen while the buttons are operated also with the right hand are extremely cumbersome. In this case, if the orientation of the portable display apparatus as seen from the screen side is altered so that the various buttons are positioned at the left hand side, then the screen ends up being inverted (the reverse of the orientation shown in FIG. 5A). Therefore, by inverting the screen by activating a screen inversion instruction button for a predetermined time or longer in the state shown in FIG. 5B, the orientation of the screen can be altered to that shown in FIG. 5A. The above also applies in the case of a left handed person. Namely, a left handed person holds the touch pen in their left hand and inputs data using the pen while operating the buttons to move the cursor with their right hand (data input mode). Therefore, the orientation of the screen when looked at from the screen side is desirably such that the various buttons are positioned at the right hand side, as seen in FIG. 5B (refer to the arrows indicating up and down in FIG. 5A). Therefore, as explained above, in the present embodiment, because the orientation of the screen can be altered independently of the apparatus body, the screen can be adjusted to an orientation which meets the needs of both a left handed person and a right handed person, thus improving the operability of the apparatus.

Moreover, because the orientation of the screen can be adjusted independently of the apparatus body, when the orientation of the screen is altered in this way, if the directions of movement of the cursor are also altered relatively together with the alteration of the screen orientation, operating the cursor buttons is difficult. Namely, when the orientation of the screen when looking at the screen is such that the various buttons are positioned at the left hand side, as shown in FIG. 7A, then the cursor 120, which is positioned at icon A, moves to the icon D, the icon E, the icon C, and the icon B when the movement instructing buttons 18, 20, 22, and 22 respectively are activated. When the screen is inverted, as is shown in FIG. 7B, if the cursor 120, which is positioned at icon A, moves to the icon D, the icon E, the icon C, and the icon B when the movement instructing buttons 18, 20, 22, and 22 respectively are activated, then the direction in which the user presumes the cursor will move when the movement instructing buttons are operated is the direct opposite to the direction in which the cursor actually does move, causing a feeling of confusion in the user.

Therefore, in the present embodiment, regardless of the orientation of the screen, absolute directions which use the orientation of the body of the portable display apparatus as a reference are designated as the directions in which the cursor is moved by each of the movement instructing buttons.

Figure 6:
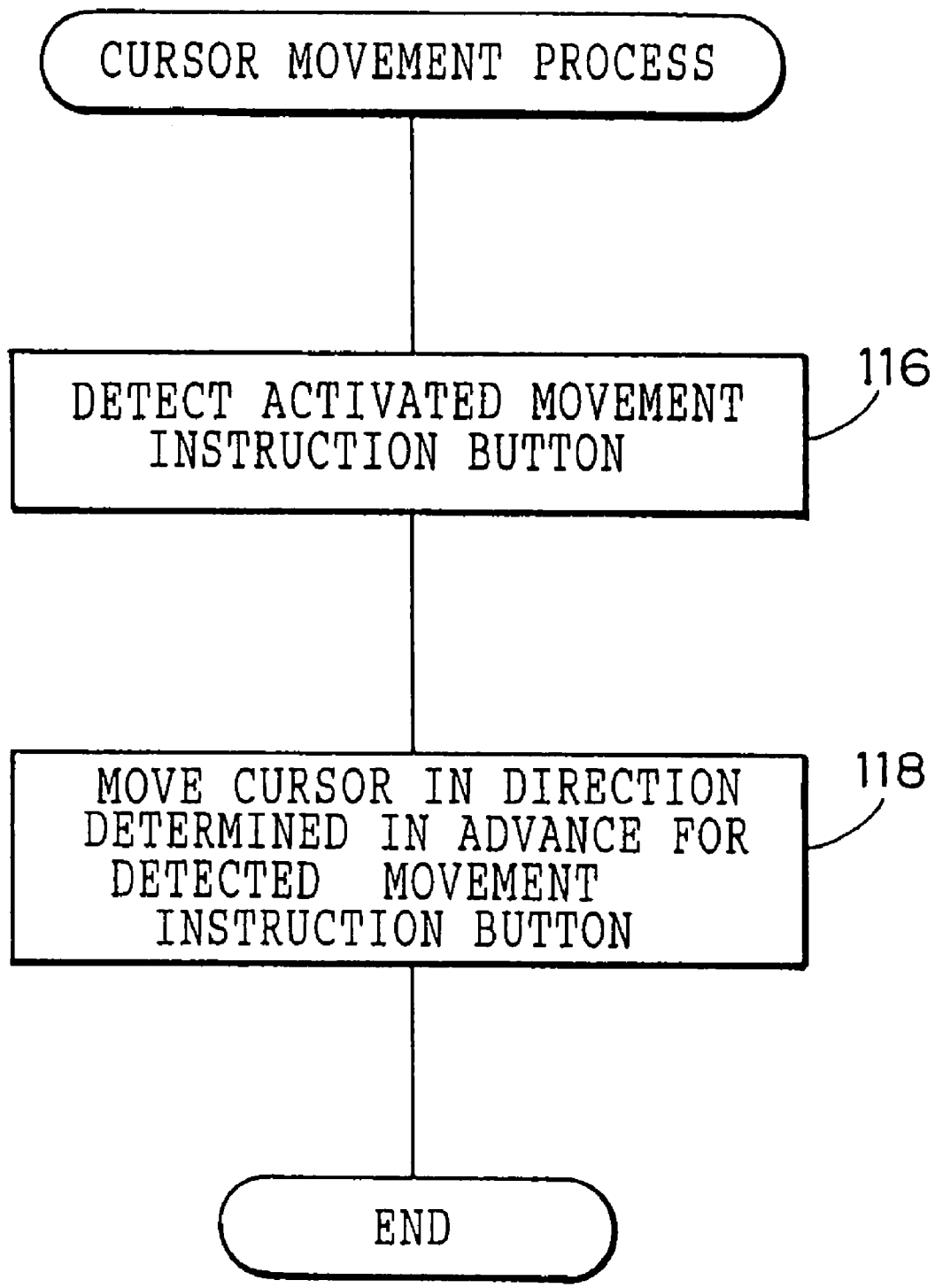
FIG. 6 is a flow chart showing a cursor movement process routine.

Namely, a cursor movement process routine which starts when one of the movement instructing buttons 18 to 24 is activated is shown in FIG. 6. In step 116 of FIG. 6, the activated movement instructing button is detected. In step 118, the cursor is moved in a predetermined direction (an absolute direction which uses the orientation of the body of the portable display apparatus as a reference) which corresponds to the detected movement instructing button.

For example, when the orientation of the screen when looking at the screen is such that the various buttons are positioned at the left hand side of the apparatus body, as shown in FIG. 7A, if the movement instructing buttons 18, 20, 22, and 24 are activated, the cursor, which was positioned over the icon A, moves respectively over the icons D, E, C, and B. While in this state, if the screen is then inverted, as is shown in FIG. 7B, if the movement instructing buttons 18, 20, 22, and 24 are activated, the cursor, which was positioned over the icon A, moves respectively over the icons B, C, E, and D.

Figure 8:
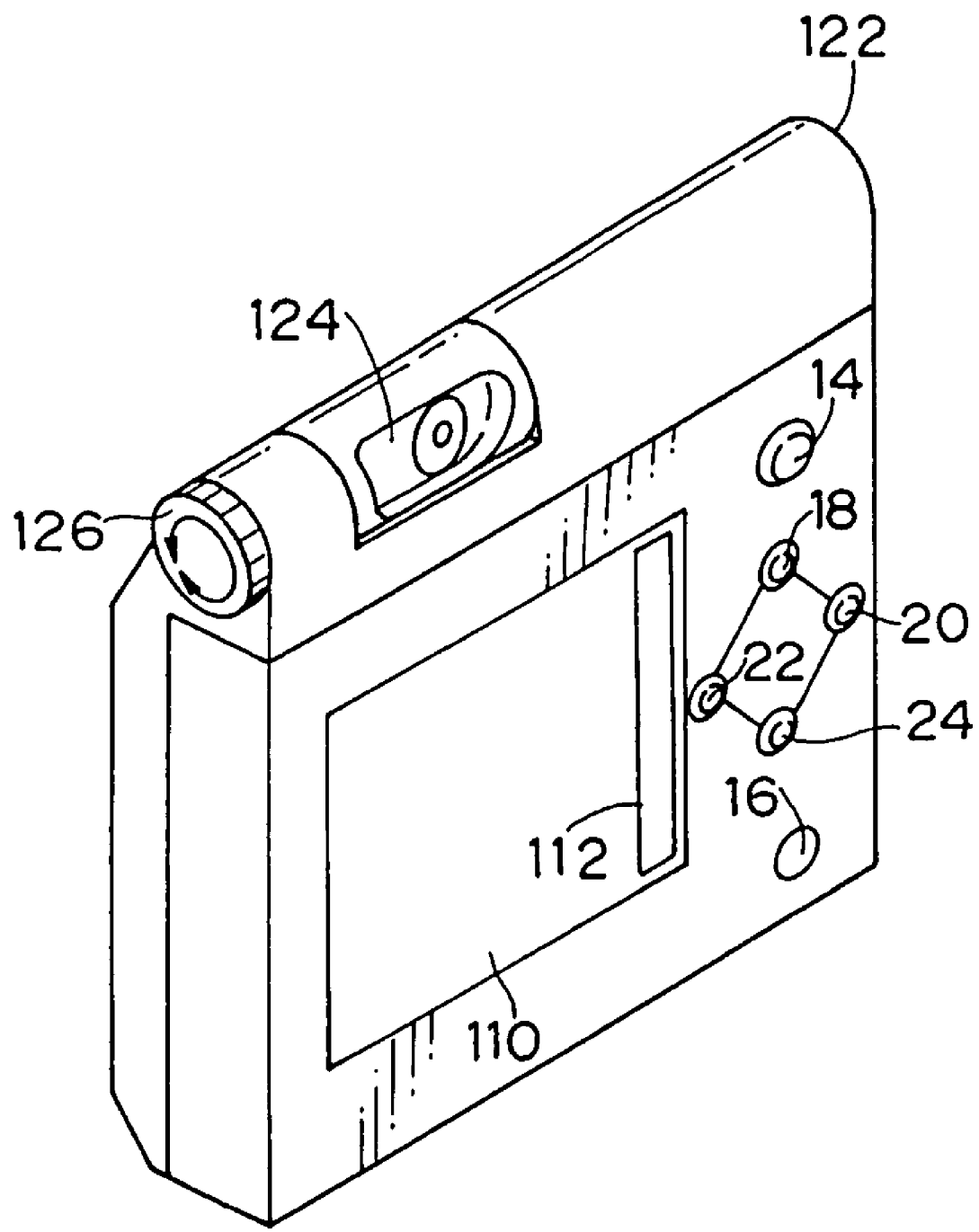
FIG. 8 is a perspective view showing an apparatus in a state where a camera unit has been mounted thereon.
Figure 10:
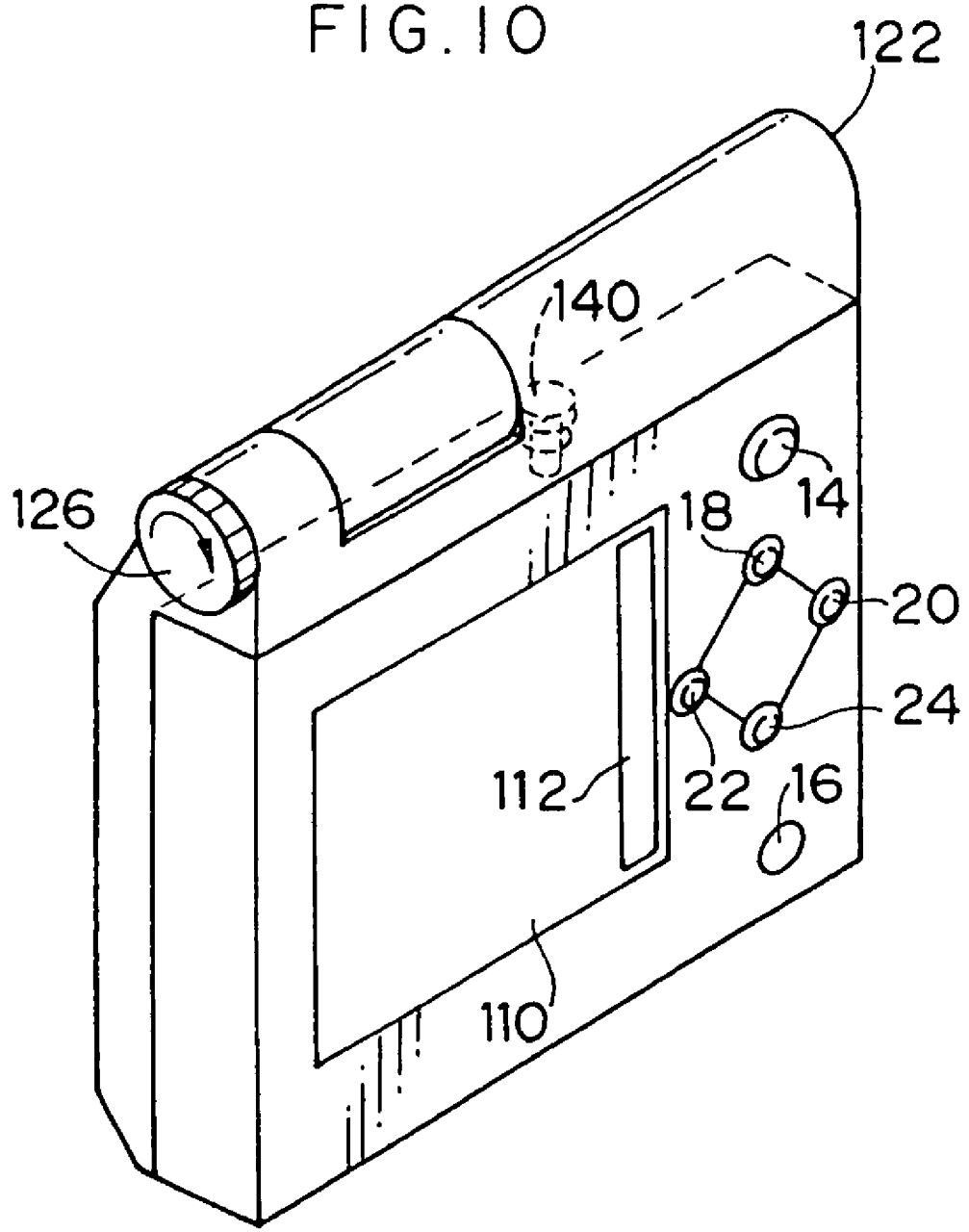
FIG. 10 shows a result of a screen direction adjustment process.
Figure 11:
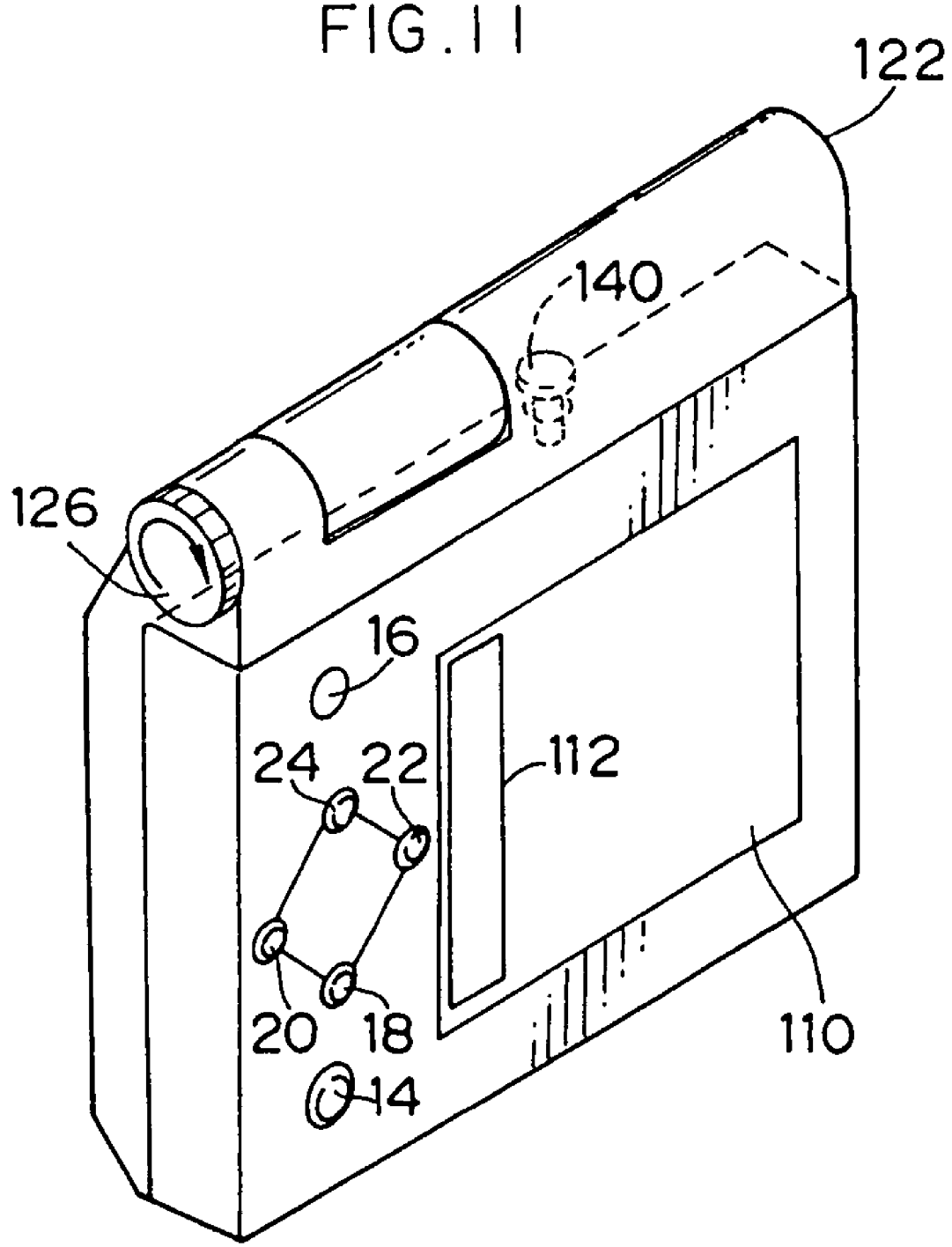
FIG. 11 shows another result of a screen direction adjustment process.

Furthermore, the present embodiment may be structured such that a camera unit 122 housing a camera 124 for photographing objects which can be rotated by adjusting a knob 126 may be mounted in a plurality of directions relative to the body of the portable display apparatus, as shown in FIG. 8. Namely, in this variant example, as shown in FIGS. 10 and 11, a screw 140 is provided inside the camera unit 122. Screw holes are formed in both one edge and another edge of the portable display apparatus to receive the screw 140. The camera unit 122 is thus formed so as to be mountable on either one edge or the other edge of the portable display apparatus body. Note that, when a camera unit 124 is mounted on the portable display apparatus body, the camera control system is connected to the portable display apparatus control system via an unillustrated terminal.

As is shown in FIG. 10, when the camera unit 122 is mounted so that the various buttons may be operated using the right hand of the user, it is desirable that the orientation of the screen is such that the top of the screen is closest to the edge on which the camera unit 122 is mounted (viewer mode). Moreover, as is shown in FIG. 11, when the camera unit 122 is mounted so that the various buttons may be operated using the left hand of the user, it is again desirable that the orientation of the screen is such that the top of the screen is closest to the edge on which the camera unit 122 is mounted (view mode). In this way, if the camera unit 122 is formed so as to be mountable in various directions relative to the body of the portable display apparatus, then if the orientation of an image is fixed relative to the apparatus body regardless of the direction in which the camera is mounted, screen viewability is poor.

Figure 9:
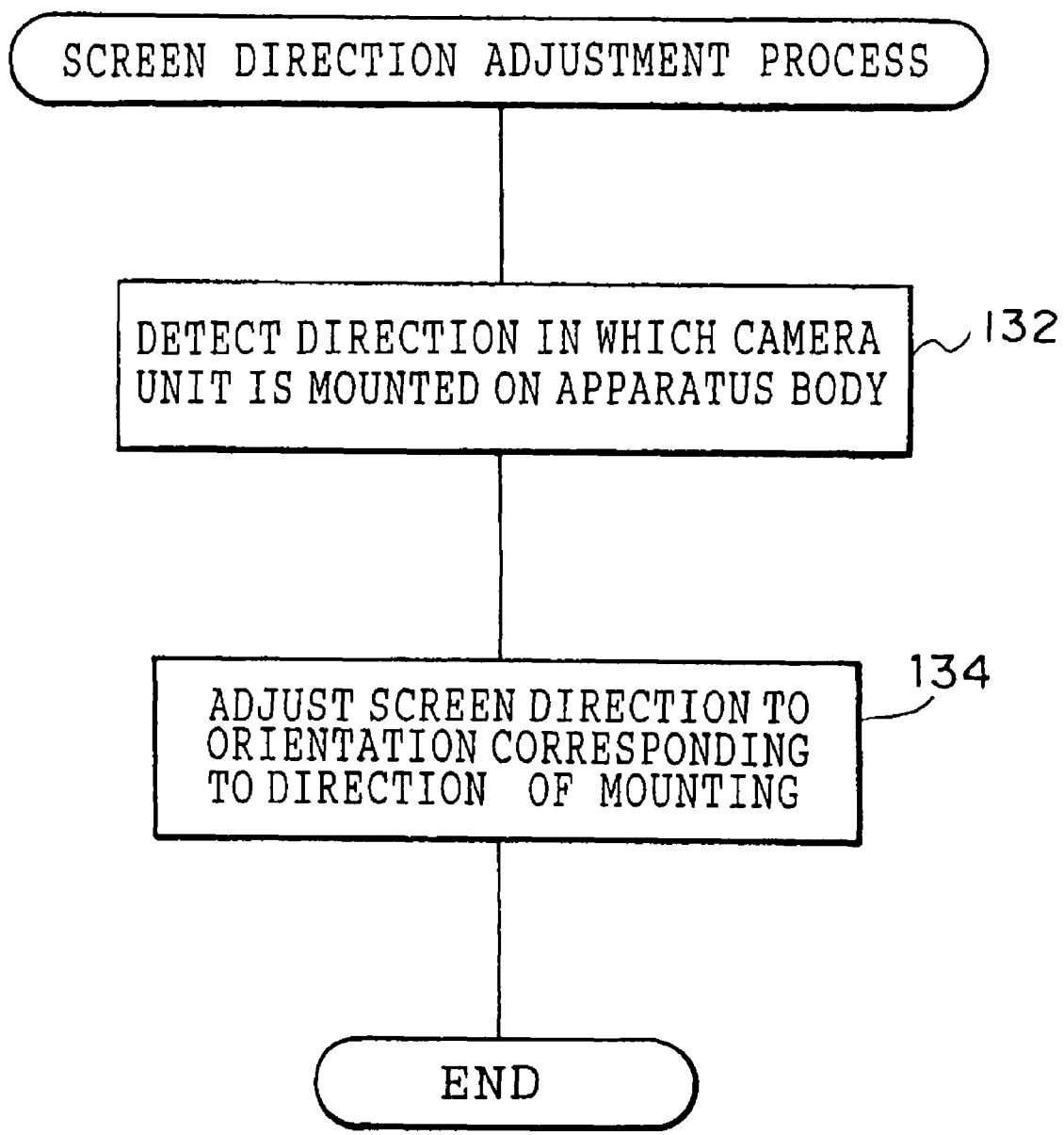
FIG. 9 is a flow chart showing a screen direction adjustment process routine when a camera unit is mounted on the apparatus.

Therefore, in the present embodiment, when the camera unit 122 is mounted, the orientation of the screen can be made to match directions determined in advance for each of the directions in which the camera unit 122 can be mounted. Namely, the screen direction adjustment process shown in FIG. 9 is started when a camera unit 122 is mounted. In step 132, the direction in which the camera unit 122 is mounted relative to the apparatus body is detected. Namely, in the present embodiment, a detection is made as to whether the camera unit 122 is mounted so that the various buttons can be operated with the right hand of the user, as shown in FIG. 10, or whether the camera unit 122 is mounted so that the various buttons can be operated with the left hand of the user, as shown in FIG. 11.

In step 134, the direction of the screen is adjusted to an orientation which corresponds to the direction in which the camera unit 122 has been mounted. Namely, if a determination is made that the camera unit 122 has been mounted in the state shown in FIG. 10, the orientation of the screen is set such that the top of the screen is closest to the edge on which the camera unit 122 is mounted. If a determination is made that the camera unit 122 has been mounted in the state shown in FIG. 11, the orientation of the screen is set such that the top of the screen is closest to the edge on which the camera unit 122 is mounted.

Figure 12:
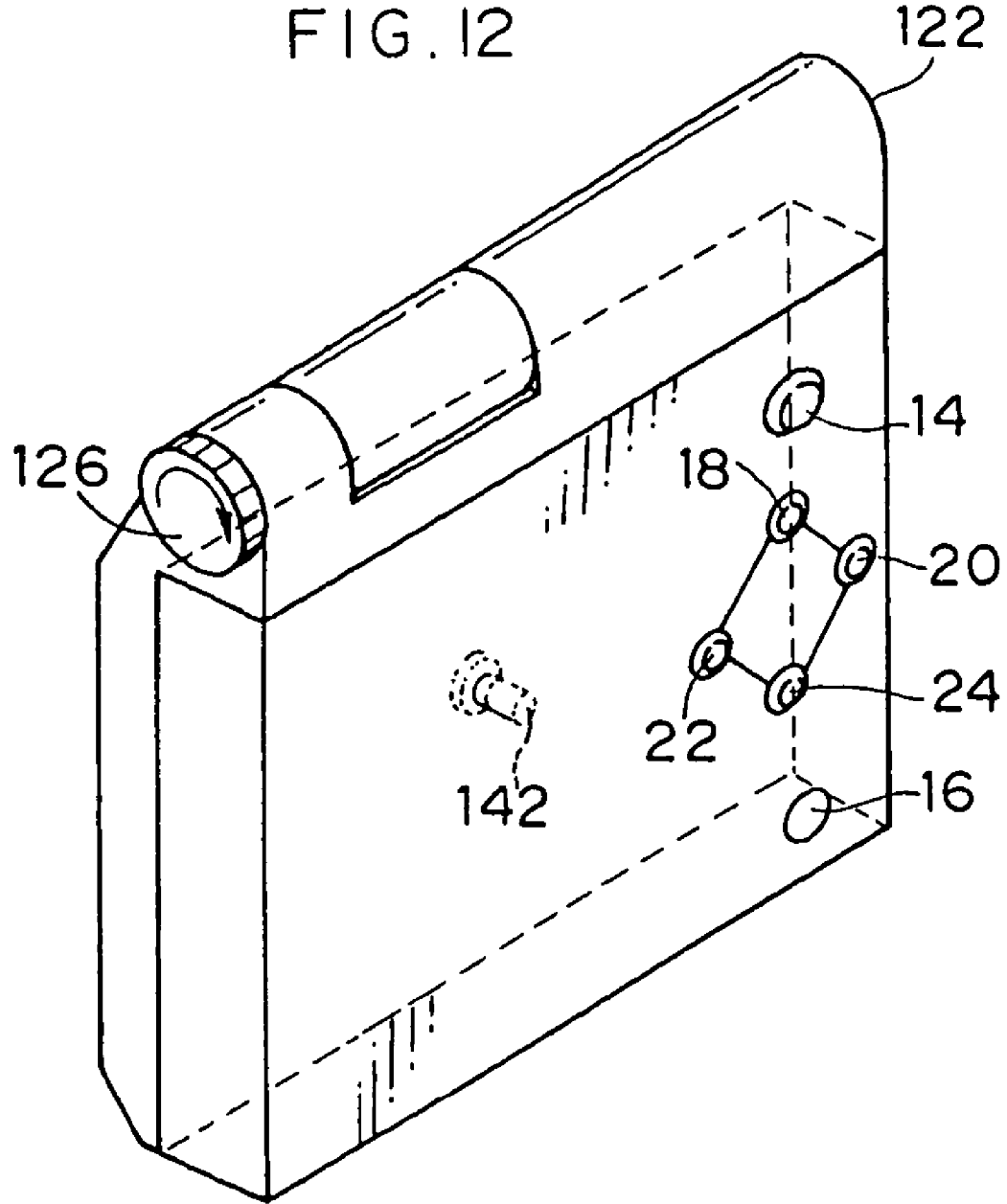
FIG. 12 shows another example (the display apparatus is not shown) of a camera unit mounted on an apparatus body.

In the example described above, the camera unit 122, depicted in FIG. 12, was formed so as to be mountable at two locations on the apparatus body, however, the present invention is not limited to this and the camera unit 122 may be made mountable to the rear surface of the portable display apparatus by a screw 142 provided at a position on the camera unit 122 which corresponds to the rear surface of the portable display apparatus.

Note that it is rare for the portable display apparatus to be operated when the body thereof is horizontal and instead it is usually operated when the body is tilted. In this case, the orientation of the apparatus body when a right handed person is operating the portable display apparatus is the opposite to that when a left handed person is operating the portable display apparatus. Consequently, detecting the direction of the tilt of the portable display apparatus can provide the knowledge as to which direction the screen should be oriented.

Figure 13:
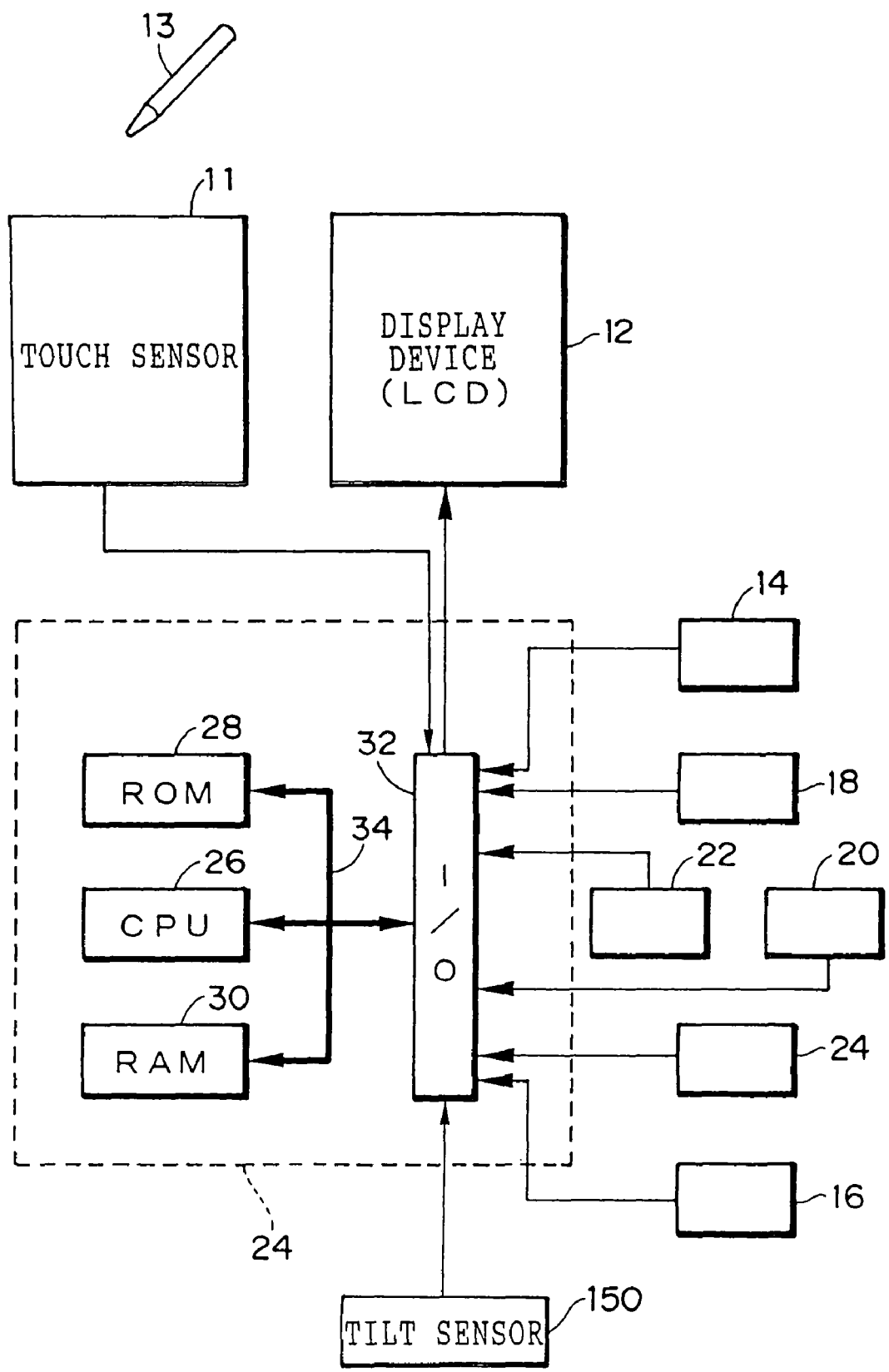
FIG. 13 is a block diagram of a portable display apparatus according to a variant example.
Figure 14:
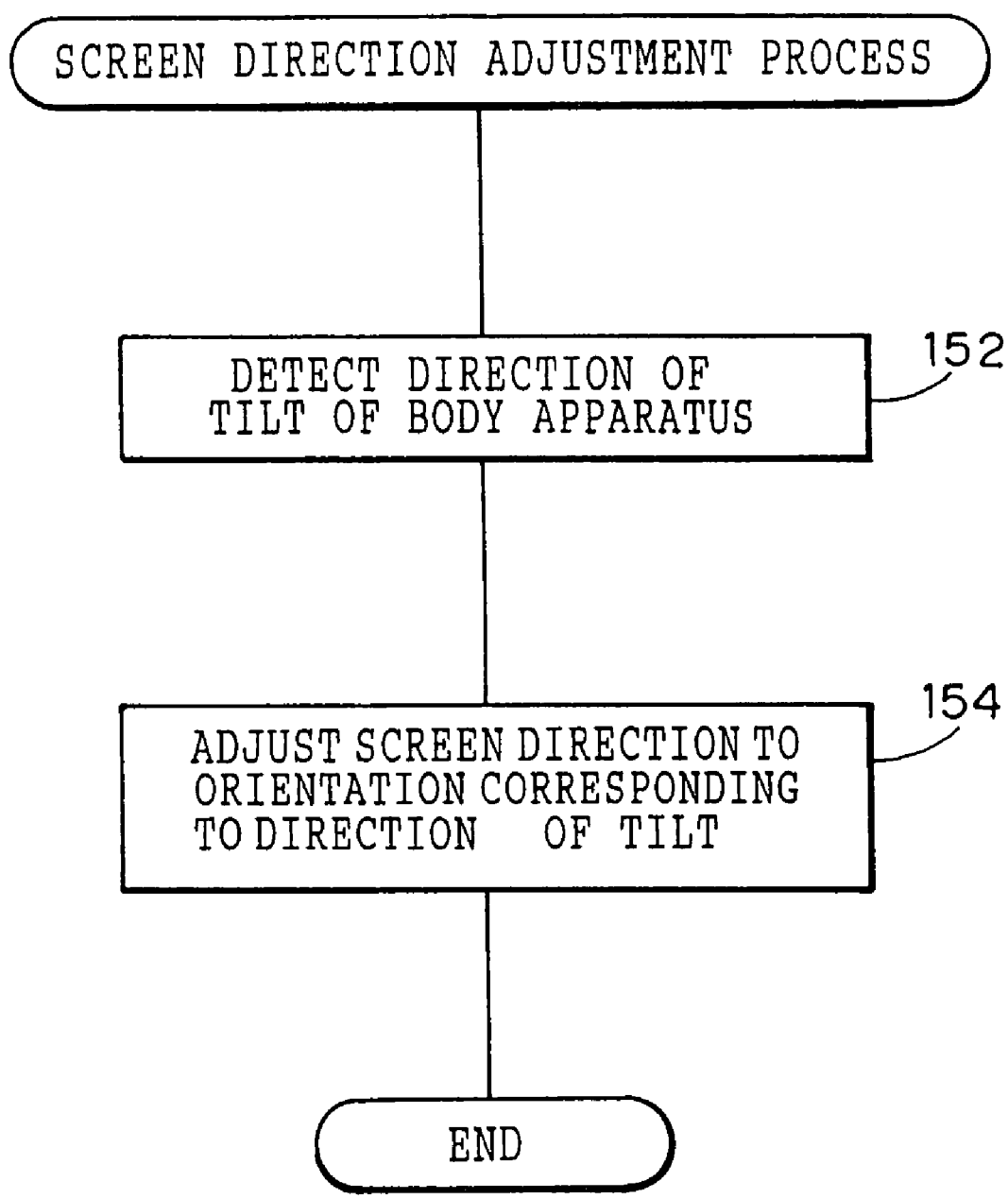
FIG. 14 is a flow chart showing a routine for a screen direction adjustment process which starts when the software for each application is started.

Therefore, it is also possible to control the orientation of the screen in accordance with the direction of the tilt of the portable display apparatus. In this case, as is shown in FIG. 13, a tilt sensor 150 is provided for detecting the direction of the tilt of the portable display apparatus and the screen direction adjustment process routine shown in FIG. 14 is executed. This routine is started when the software for each application is run. Namely, in step 152, the direction of the tilt of the portable display apparatus is detected. In step 154, the direction of the screen is adjusted to an orientation which corresponds to the tilt direction. Namely, when the data input mode application software is run, when the tilt is such that the various buttons are positioned on the left hand side of the screen, the orientation of the screen is adjusted to one for when the buttons are positioned to the left of the screen. In contrast, when the tilt is such that the various buttons are positioned on the right hand side of the screen, the orientation of the screen is adjusted to one for when the buttons are positioned to the right of the screen. If the view mode application software is run, when the tilt is such that the various buttons are positioned on the right hand side of the screen, the orientation of the screen is adjusted to one for when the buttons are positioned to the right of the screen. In contrast, when the tilt is such that the various buttons are positioned on the left hand side of the screen, the orientation of the screen is adjusted to one for when the buttons are positioned to the left of the screen.

In the example described above, the screen inversion is carried out on the basis of the operation of the screen inversion instruction buttons, the result of the detection by the tilt sensor, and the direction in which the camera unit is mounted, however, the present invention is not limited to this. For example, a menu bar for inverting the screen may be displayed on the screen and an instruction to invert the screen may be given by touching the menu bar with a touch pen.

Furthermore, in the above described embodiment, the orientation of the screen vias altered by 180 degrees, however, the present invention is not limited to this, and the screen may be altered by another angle, for example, 90 degrees. In this case, the screen may be inverted in sequence by 90 degrees each time the screen inversion instruction button is activated for a predetermined length of time or more.

Furthermore, the following processings may also be performed in the present portable display apparatus.

Figure 15:
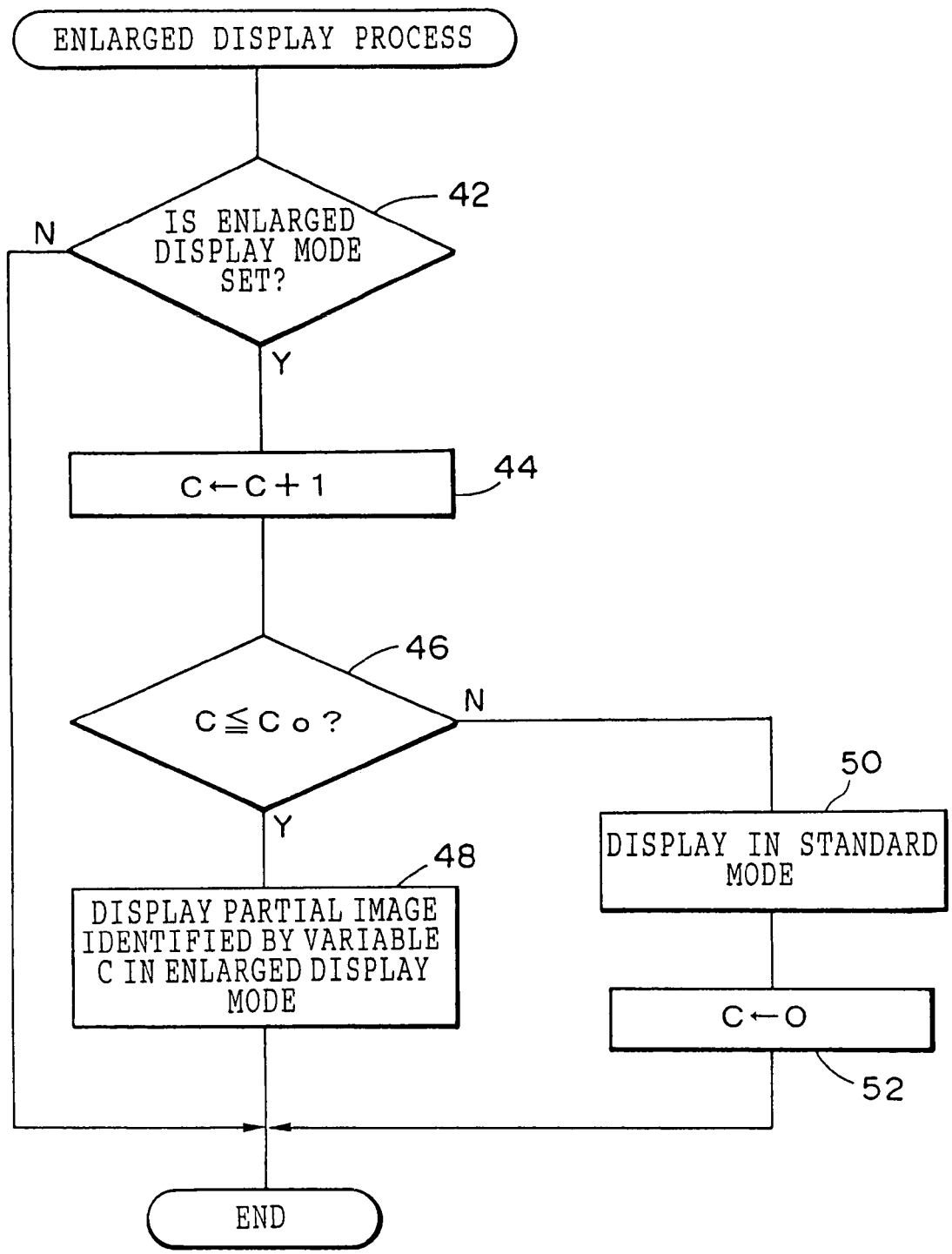
FIG. 15 is a flow chart showing a routine for an enlarged display process according to the variant example.
Figure 16:
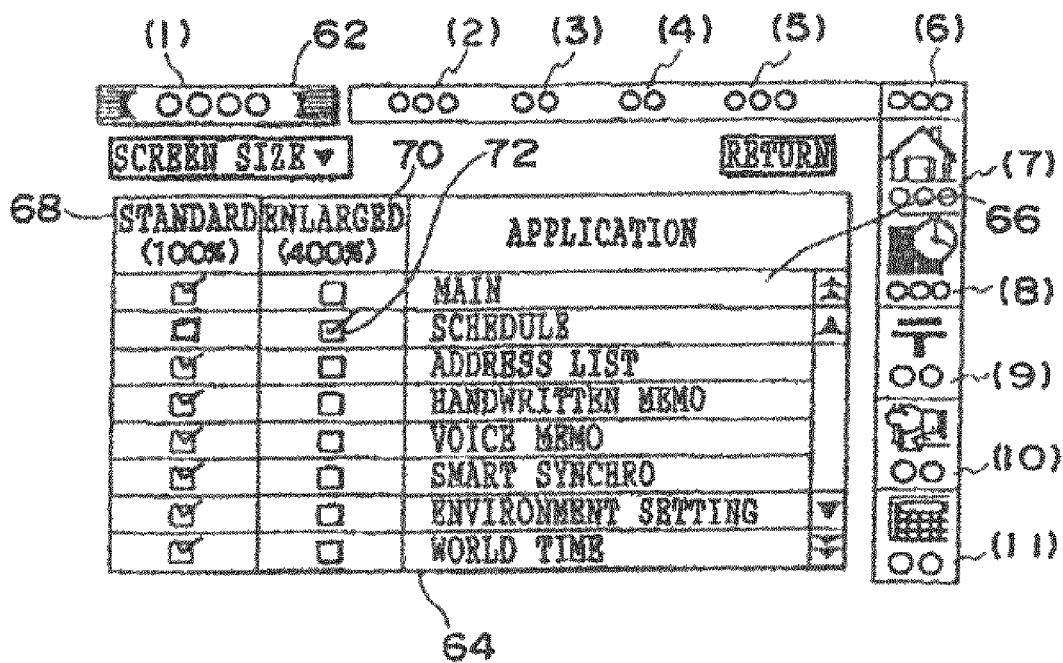
FIG. 16 shows the displayed screen for enlarged display mode setting.

An enlarged display processing routine which starts when either of the above first screen inversion instruction button 14 and second screen inversion instruction button 16 is activated is shown in FIG. 15. In step 42 of FIG. 15, a determination is made as to whether or not enlarged display mode is set for the application software being executed to display the current image on the display device 12. An enlarged display mode setting screen 64 for setting an enlarged display mode for each application software is shown in FIG. 16. This enlarged display setting screen is displayed when an environment setting button 62 set in an unillustrated initial screen is activated. As is shown in FIG. 16, an area 68 for making a setting in the menus 66 of each application software such that that particular application software is only displayed in standard mode, and an area 70 for making a setting so as to make it possible for a partial image which is described below to be displayed in enlarged display mode at a predetermined magnification (400% in the present embodiment) are correspondingly provided on the enlarged display mode setting screen 64. By selecting the area 68 or 70 selectively for each application, the user can make a setting so that the application is only displayed in standard mode or so that the application can be displayed in enlarged display mode. In the present embodiment, an example is described in which the software of a scheduling application is set so as to be displayable in enlarged display mode.

Figure 17A:
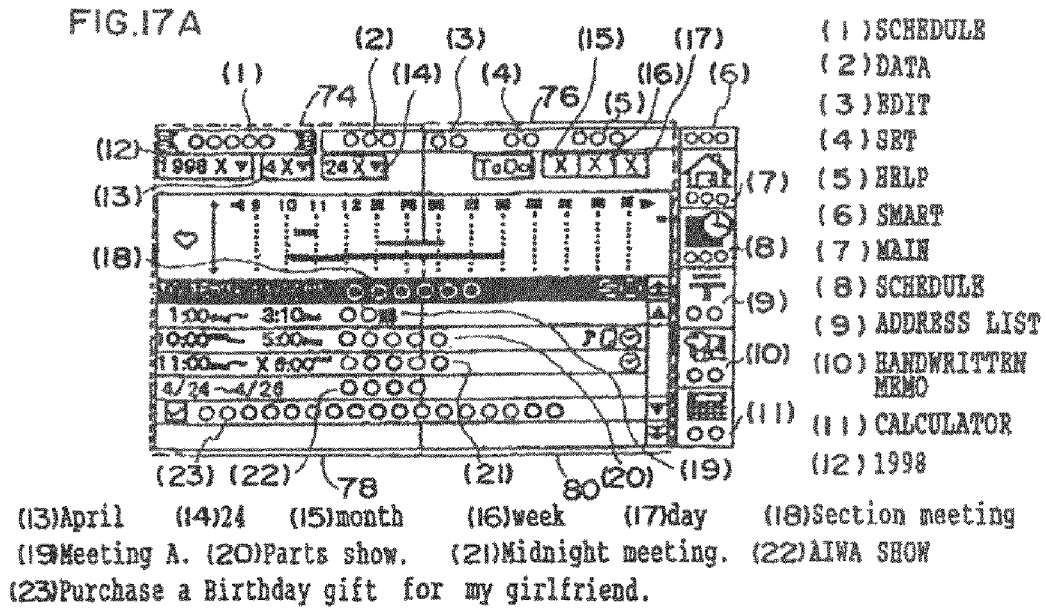
FIGS. 17A and 17B show the contents of an enlarged display of a split image.

In the next step 44, a variable C is increased by an increment of one. The variable C is separately determined for each application and is reset each time the software of an application is executed (C=0). Each time the variable C is incremented by one, a partial image, formed by splitting the image displayed on the display device 12 into a predetermined number of portions (four in the present embodiment), is identified as being, in sequence, a top left partial image 74, a top right partial image 76, a bottom left partial image 78, and a bottom right partial image 80, as is shown in FIG. 17A.

Figure 17B:
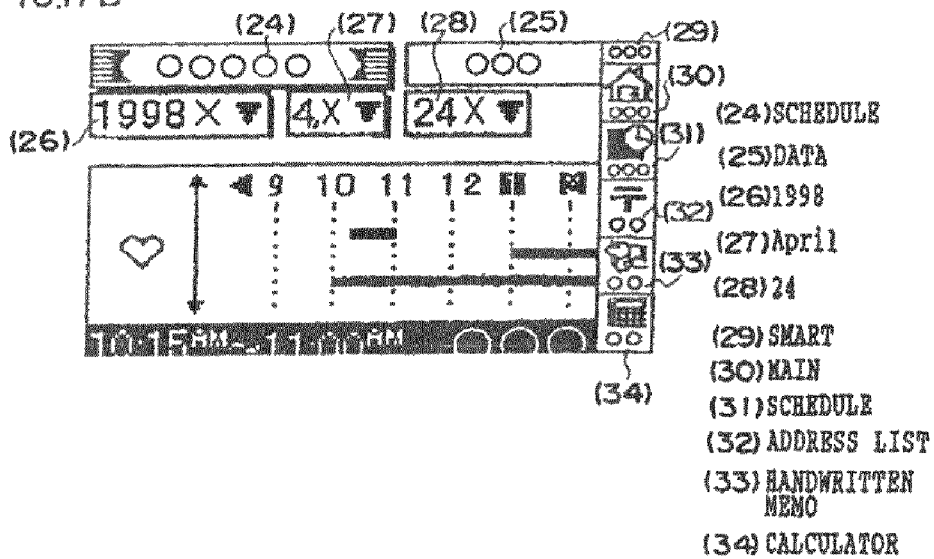

In step 46, a determination is made as to whether or not the variable C is equal to or less than the sum C0 (four in the present embodiment) of the partial images. If the variable C≦C0, the partial image identified by the variable C in step 48 is displayed in enlarged display mode. Namely, in step 48, the partial image identified by the variable C (for example, the top left partial image 74 when C=1) is displayed at the aforementioned enlarged magnification (400%), as is shown in FIG. 17B.

If, however, the determination in step 46 is that C>C0, after each of the partial images have been displayed in enlarged display mode, because one of the screen inversion buttons 14.and 16 is activated, the display is set to standard mode in step 50 and, in step 52, the variable is reset to 0.

As has been explained above, because the user merely has to activate one of the screen inversion buttons 14 and 16 when altering a partial image, the alteration of a partial image can be easily performed.

Figure 18:
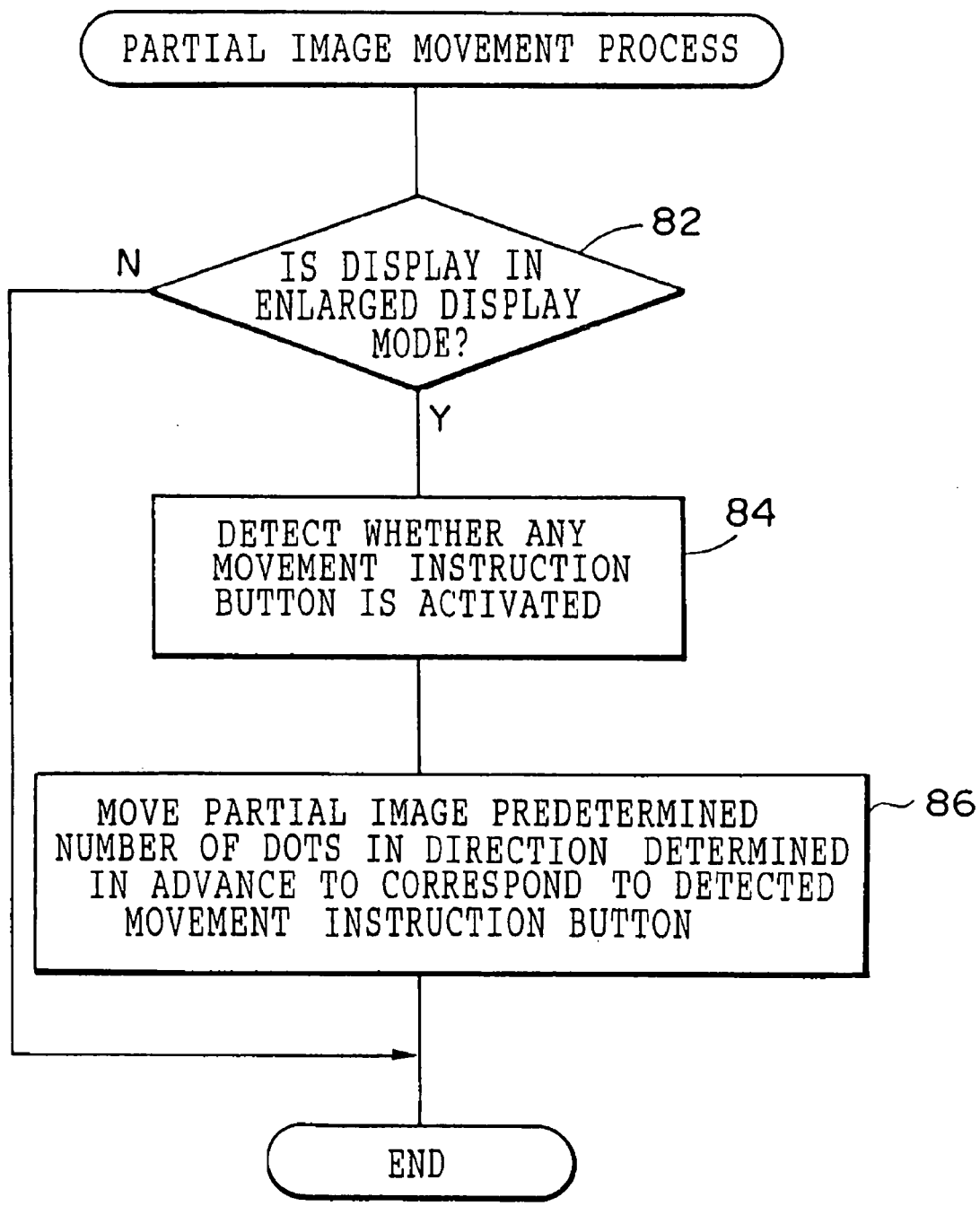
FIG. 18 is a flow chart showing a split image movement process routine.

A partial image movement processing routine executed when one of the movement instruction buttons 18 to 24 is activated is shown in FIG. 18. In step 82 of FIG. 18, a determination is made as to whether or not an image is being displayed in enlarged display mode on the display device 12. If the result of the determination is that the image is being displayed in enlarged display mode, then, in step 84, whether or not one of the movement instruction buttons 18 to 24 has been activated is detected. In the next step 86, the partial image is moved by a predetermined number of dots D0 in a direction determined in advance corresponding to the detected movement instruction button 18 to 24.

Namely, in the present embodiment, the movement instruction button 18 is determined in advance to instruct the partial image to be moved upwards; the movement instruction button 20 is determined in advance to instruct the partial image to be moved towards the right; the movement instruction button 22 is determined in advance to instruct the partial image to be moved towards the left; and the movement instruction button 24 is determined in advance to instruct the partial image to be moved downwards. Furthermore, in the present embodiment, the partial image is set in advance to be moved by a predetermined number of dots D0 (for example, 12 dots) when one of the movement instruction buttons 18 to 24 is activated, as is shown in FIG. 19A. As a result, in the above described example, namely, when the movement instruction button 20 is activated to instruct a movement to the right while the top left partial image 74 is being displayed in enlarged display mode, the partial image is altered to a partial image whose left and right sides are moved further to the right by the predetermined number of dots D0. Accordingly, compared to the top left partial image 74 displayed in enlargement before the movement instruction button 20 is activated, as shown in FIG. 19B, the partial image displayed in enlargement when the movement instruction button 20 has been activated is moved towards the right by the predetermined number of dots D0, as shown in FIG. 19C.

In the above described embodiment, the partial image is moved by a predetermined number of dots each time one of the movement instruction buttons 18 to 24 is activated, however, the present invention is not limited to this. For example, the speed of movement of the partial image may be controlled so as to increase the longer the movement instruction button is activated. Moreover, in the above described embodiment, the movement of the position of the partial image is instructed by a movement instruction button, however, the present invention is not limited to this. For example, if a touch pen is used, then the movement of the partial image may be instructed by touching the display screen of the display device 12 with the touch pen. In this case, the partial image may be moved in a direction towards the position on the screen touched by the touch pen from the center of the display screen of the display device 12. Furthermore, the speed of movement of the partial image may be controlled so as to increase the further the distance from the center of the display screen of the display device 12 to the position touched by the touch pen.

Note that, in the above describe embodiment, display enlargement was instructed using the screen inversion buttons and movement of the partial image was instructed using the movement instruction buttons, however, the present invention is not limited to this. For example, these instructions may be given using a menu bar provided on the display screen. Namely, the above instructions may be given by touching the menu bar with the touch pen.

Moreover, in the present embodiment, an image was split into four portions, however, the present invention is not limited to this. For example, the image may be split into a plurality of portions other than four. It is also possible to set the number of portions into which an image is split depending on the aforementioned application software.

Further, in the present embodiment, the magnification of the enlargement when a partial image was displayed in enlargement was fixed to correspond to the software of each application, however, the present invention is not limited to this. For example, it is possible to optionally set the magnification of the enlargement when a partial image is displayed in enlargement for each application.

Note also that, in the above example, the reason why the image was split into four and the enlargement magnification was set to 400% was in order to correspond the area of the enlarged partial image to the area for displaying an image on the display device 12. Accordingly, the enlargement magnification when an image is split into a plurality of portions other than four is a magnification at which the area of the enlarged partial image corresponds to the area for displaying an image on the display device 12. Note that, in the present invention, the above described enlargement magnification is not necessarily a magnification at which the area of the enlarged partial image corresponds to the area for displaying an image on the display device 12, and it is sufficient if the enlargement magnification is such that the area of the enlarged partial image is at least equal to or less than the area for displaying an image on the display device 12. Note further that, in this case, it is possible to display the enlarged partial image by superposing the enlarged partial image over the image before enlarging the image.

In the above described embodiments, a portable display apparatus was used in the examples described, however, the present invention is not limited to this. The present invention may also be applied to other electronic devices such as, for example, a personal computer and a digital camera.

The invention claimed is:

1. An electronic apparatus having a display function, the apparatus comprising:
   a rectangular display unit;
   a touch sensor which is located on the rectangular display unit;
   a tilt sensor which detects a direction of a tilt of the electronic apparatus;
   a processor that runs an electronic application in response to a user selection of an icon corresponding to the application, and controls an orientation of displayed information of the application based on the tilt direction of the electronic apparatus;
   an operation unit disposed on a line which is perpendicular to a short side of the rectangular display unit and starts and ends in a middle of the short side of the rectangular display unit; and
   a camera unit, wherein
   the processor starts an automatic screen direction adjustment process routine as a result of the application being run in response to the user selection of the icon corresponding to the application, and controls the orientation of the displayed information of the application in accordance with the automatic screen direction adjustment process routine.

2. The electronic apparatus according to claim 1, wherein the processor controls the rectangular display unit to display a plurality of icons or a menu.

3. The electronic apparatus according to claim 1, wherein the processor enlarges the displayed information based on a user input on the touch sensor.

4. The electronic apparatus according to claim 1, wherein the processor scrolls up and down the displayed information based on a user input on the touch sensor.

5. The electronic apparatus according to claim 1, wherein the processor starts the automatic screen direction adjustment process routine only after one of a plurality of applications is run.

6. The electronic apparatus according to claim 1, wherein the processor runs one of a schedule application and an address list application in response to the user selection of the icon corresponding to the application.

7. The electronic apparatus according to claim 1, wherein the processor controls the rectangular display unit to display a plurality of icons in a grid pattern.

8. The electronic apparatus according to claim 1, wherein the processor controls the orientation of the displayed information of the application in real time.

9. The electronic apparatus according to claim 1, wherein the processor controls the rectangular display unit to display a plurality of icons corresponding to a plurality of applications, and runs the application in response to a user selection of one of the plurality of icons corresponding to the plurality of applications.

10. A method of adaptive display and organization of information on an electronic apparatus including a camera based on a tilt direction of the electronic apparatus, the method comprising:
    displaying an icon corresponding to an electronic application on a rectangular display unit;
    receiving a user selection of the icon corresponding to the application via a touch sensor, which is located on the rectangular display unit;
    running the application corresponding to the icon, in response to the user selection of the icon;
    detecting the tilt direction of the electronic apparatus by a tilt sensor;
    starting an automatic screen direction adjustment process routine as a result of the application being run in response to the user selection of the icon corresponding to the application; and
    controlling an orientation of displayed information of the application based on the tilt direction of the electronic apparatus, and in accordance with the automatic screen direction adjustment process routine, by a processor.

11. The method according to claim 10, further comprising:
    controlling, by the processor, the rectangular display unit to display a plurality of icons or a menu.

12. The method according to claim 10, further comprising:
    controlling, by the processor, the rectangular display unit to enlarge the displayed information based on a user input on the touch sensor.

13. The method according to claim 10, further comprising:
    controlling, by the processor, the rectangular display unit to scroll up and down the displayed information based on a user input on the touch sensor.

14. The method according to claim 10, wherein the starting step comprises starting the automatic screen direction adjustment process routine only after one of a plurality of applications is run.

15. The method according to claim 10, wherein
    the display step comprises displaying a plurality icons corresponding to a plurality of applications; and
    the receiving step comprises receiving a user selection of one of the plurality of icons corresponding to the plurality of applications.

16. An electronic apparatus having a display function, the apparatus comprising:
    a rectangular display unit;
    a touch sensor which is located on the rectangular display unit;
    a tilt sensor configured to detect a direction of a tilt of the electronic apparatus;
    a processor configured to run an electronic application based on a user selection of an icon corresponding to the application, and to control an orientation of displayed information of the application based on the detected tilt direction of the electronic apparatus; and
    a camera unit, wherein
    the processor is configured to start an automatic screen direction adjustment process routine when the application is run based on the user selection of the icon corresponding to the application, and to control the orientation of the displayed information of the application in accordance with the automatic screen direction adjustment process routine.

17. The electronic apparatus according to claim 16, wherein the processor is configured to control the rectangular display unit to display a plurality of icons corresponding to a plurality of applications, and to run the application based on a user selection of one of the plurality of icons corresponding to the plurality of applications.

* * * * *